Nov. 6, 1945.  F. E. CREVER  2,388,527

ELECTRORESPONSIVE SYSTEM

Filed July 13, 1944

Inventor:
Frederick E. Crever,
by Harry E. Dunham
His Attorney.

Patented Nov. 6, 1945

2,388,527

UNITED STATES PATENT OFFICE 2,388,527

ELECTRORESPONSIVE SYSTEM

Frederick E. Crever, Scotia, N. Y., assignor to General Electric Company, a corporation of New York Application July 13, 1944, Serial No. 544,780

19 Claims. (Cl. 290—4)

This invention relates to electroresponsive systems and more particularly to improvements in alternating-current watt-responsive devices and systems controlled thereby.

In order to measure the amount of power flowing in an alternating-current circuit it is necessary to discriminate between the power component of current which is in phase with the voltage and the wattless component of current which is in quadrature with the voltage. In accordance with the principal feature of this invention, there is provided a novel and simple electroresponsive circuit which is normally balanced by a particular relation between the in-phase component of the current and the voltage, and which balance is independent of the quadrature component of the current. This electroresponsive circuit is useful for automatically controlling the load on an alternating-current generator either to hold constant load or to vary the load in accordance with variations in certain operating conditions of an alternating-current power system.

An object of the invention is to provide a new and improved electroresponsive system.

Another object of the invention is to provide a new and improved watt responsive circuit.

A further object of the invention is to provide a new and improved automatic load control system.

The invention will be better understood from the following description taken in connection with the accompanying drawing and its scope will be pointed out in the appended claims.

Figure 1:
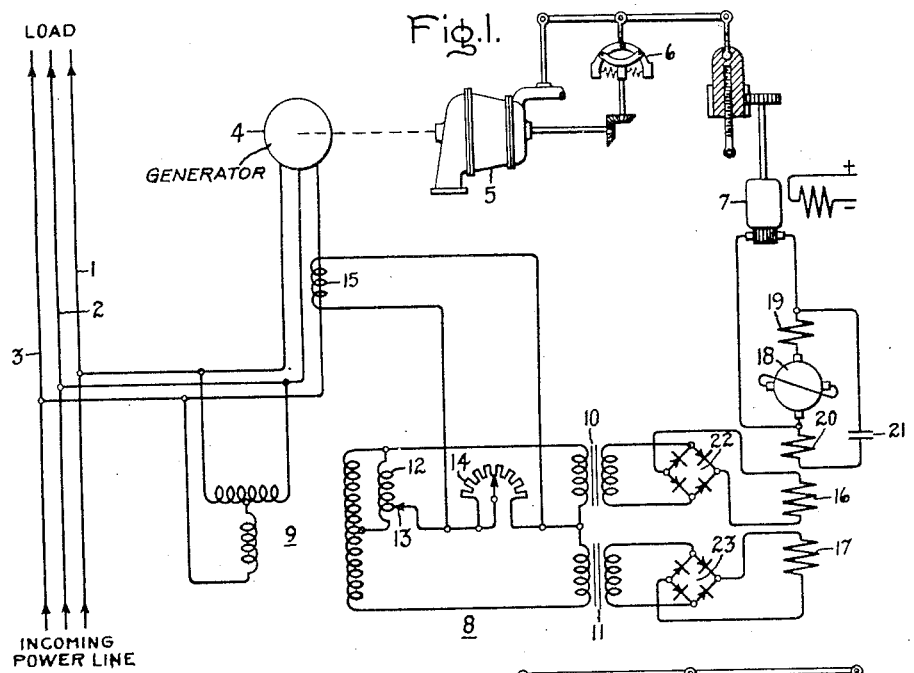
Figure 2:
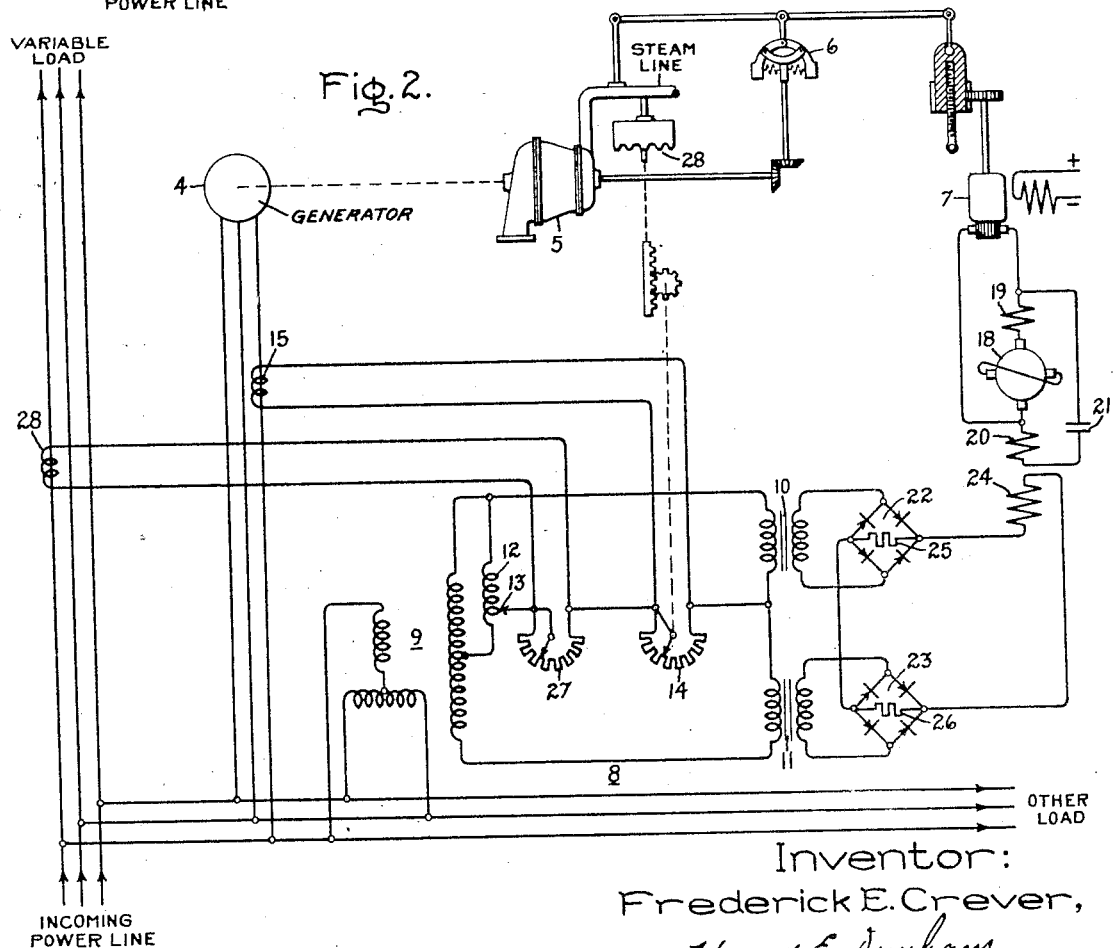

In the drawing, Fig. 1 is a diagrammatic illustration of an embodiment of the invention and Fig. 2 is a modification.

Referring now to the drawing and more particularly to Fig. 1, there is shown, by way of example, a nominally constant voltage three-phase alternating-current power circuit having conductors 1, 2 and 3. This circuit is shown as receiving power at the bottom from an incoming power line and delivering power at the top to a load. Connected to this circuit is a three-phase alternator 4 (alternating-current generator) which is driven by any suitable prime mover, such as a steam turbine 5, the steam supply to which is controlled by a governor 6. This governor may be of any suitable type. The setting of the governor is controlled by a motor 7 which is normally at rest and which operates to increase the power output of the turbo-alternator when it turns in one direction and to decrease the power output of the turbo-alternator when it turns in the other direction.

The operation of the motor 7 is controlled automatically in response to the load on or power output of the alternator 4 by means of a watt-responsive system indicated generally at 8. This comprises a potential transformer 9 whose primary winding is connected across the output circuit of the alternator 4 and whose secondary winding is connected to the primary windings of two auxiliary transformers 10 and 11 in series. A small adjustable voltage transformer 12 has its primary winding connected across the upper half of the secondary winding of the potential transformer 9. This small transformer 12 has a sliding contact 13 which is connected to the junction of the primary windings of the auxiliary transformers 10 and 11 through a rheostat 14. Current proportional to the output current of the alternator 4 is circulated in the rheostat 14 by means of a current transformer 15 connected in a particular one of the lines of the output circuit of the alternator 4. This is the line whose current at unity power factor on the alternator is in phase with the voltage of the secondary winding of the potential transformer 9.

The voltages of the auxiliary transformers 10 and 11 control the direction of operation of the motor 7 in opposite directions by energizing respectively forward and reverse controlling field windings 16 and 17 for a direct-current generator 18 whose output terminals are connected to the armature of the motor 7. The latter is shown as having a separately excited field winding which has an unchanging polarity so that changes in the polarity of the generator 18 will reverse the motor 7. The generator 18 is of the compensated armature reaction excited type having a series winding 19 and an anti-hunting winding 20 which is connected across its armature terminals through a capacitor 21 so that current can only flow in the anti-hunting winding when the voltage of the generator is changing. Rectifiers 22 and 23 are interposed between the secondary windings 10 and 11 of the auxiliary transformers and their associated control windings 16 and 17.

The operation of Fig. 1 is as follows: Assume that the main power circuit is energized and is delivering power to the load and that the turbine 5 is also driving the alternator 4 and that the latter is supplying power to the main circuit so as to share some of the load on the main circuit. The amount of power which the generator 4 delivers to the system is determined by the setting of the slider 13 on the variable voltage transformer 12 because the secondary voltage of this transformer 12 must be balanced by the voltage drop in the potentiometer rheostat 14 in order for the voltages of the auxiliary transformers 10 and 11 to be equal and only under these conditions will the generator 18 be unexcited and the motor 7 be at rest.

The primary winding of the auxiliary transformer 10 is energized by the vector resultant of the voltage drop in the rheostat 14 and the voltage of the upper part of the variable voltage transformer 12, and the primary winding of the auxiliary transformer 11 is energized by the vector resultant of the voltage drop in the rheostat 14 and the remaining part of the voltage of the secondary winding of the potential transformer 9. This latter voltage is made up of the voltage of the lower half of the secondary winding of the potential transformer 9 and the voltage of the remaining part of the variable voltage transformer 12. In order for the control circuit to balance, therefore, the voltage drop in the rheostat 14 has to be equal in magnitude and opposite in phase to the voltage setting of the variable voltage transformer 12 or, in other words, it has to be equal and opposite to the voltage displacement of the slider 13 from the mid-point of the secondary winding of the potential transformer. By reason of the connections of the potential transformer 9 and the current transformer 15, this balance is obtained by the in-phase component of the generator current. Consequently, the quadrature component will affect the energization of both auxiliary transformers 10 and 11 equally and will therefore have no effect on the balanced condition of the circuit.

If now operating conditions change, for example, if the load on the system changes, the turbo-alternator will normally tend to change its output also. However, any change in the in-phase component of the current of the generator 4 will change the balance between the voltage drop in the rheostat 14 and the setting of the adjustable voltage transformer 12 and thus will change the balance between the energizations of the auxiliary transformers 10 and 11 and this balance will vary in opposite directions depending upon whether the power output of the generator 4 has increased or decreased. Consequently, either the forward or reverse controlling field winding 16 or 17 will predominate and thus will cause the polarity of the generator 18 to be such as to cause the motor 7 to turn in the proper direction to return the load to its pre-established value.

In the modification shown in Fig. 2, there are two separate and distinct loads applied to the system, one being a variable load, such as a steel strip mill, and the other being typically a relatively constant load, such as the remainder of a steel plant. This other load is indicated as being connected to the branch circuit to which the generator 4 is connected.

Like the control system of Fig. 1, that of Fig. 2 responds to the in-phase component of the current of the generator 4 in such a manner as normally to hold the generator load constant. One difference between the control systems of the two figures is that forward and reverse control field windings 16 and 17 for the generator 18 have been replaced by a single control field winding 24 which is energized by the difference in voltage across resistors 25 and 26 which are connected respectively across the output terminals of the rectifiers 22 and 23. Thus, under balanced conditions the control winding 24 is de-energized because the difference between the voltage drops across the resistors 25 and 26 is zero but whenever the load on the alternator departs from its pre-set value the balanced condition of the control system is upset, thus causing more current to flow in one resistor than in the other and thus energizing the control winding 24 with such polarity as to cause the rest of the system to return the load to its predetermined value.

The above-described action of the system is modified in accordance with variations in the variable load in such a manner as to make the turbo-alternator carry any desired predetermined percentage (including 100%) of the variable load. This is done by connecting another rheostat 27 in series with the rheostat 14 and circulating a current through it which is proportional to the current in the variable load. This in turn is done by a current transformer 28 which is connected in the same phase of the system as the current transformer 15. The polarity of the latter connections is such that the in-phase component of the current of the variable load causes a voltage drop in the rheostat 27 which is additive to the voltage displacement produced by the slider 13 of the variable voltage transformer 12. Thus, an increase in variable load is in effect equivalent to displacing the slider 13 further from the mid-point of the secondary winding of the potential transformer 9 so that an increase in the in-phase component of the current of the generator 4 is required in order to balance the system and bring the governor adjusting motor 7 to rest. The particular percentage of the variable load which is picked up by the alternator 4 is adjusted by varying the setting of rheostat 27. By setting the rheostat 27 so that generator 4 carries all the variable load, fluctuation in load on the incoming power line can be held to a minimum. At the same time generator 4 can be made to carry a fixed base load.

In order to make the control system responsive to changes in steam pressure of the turbine 5, a pressure gauge 28 is connected to the rheostat 14 so as to vary its resistance inversely with changes in steam pressure. In this manner both the base load carried by the generator 4 and the percentage of the variable load which is picked up by this generator are reduced when the steam pressure of the turbine 5 is reduced and, conversely, if the steam pressure is increased, both the base load and the percentage of the variable load carried by the generator 4 are increased.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In an alternating-current power circuit having an alternator for delivering power to said circuit, means for varying the power delivered by said alternator to said circuit, control means responsive to the power delivered by said alternator for operating said power varying means so as to maintain said power substantially constant, said control means being responsive to the differential effect of a pair of resultant voltages, each resultant voltage having two components one of which is responsive to the voltage of said circuit and the other of which is responsive to the current of said circuit, said current and voltage responsive components being in phase at unity power factor on said circuit, and means for varying the relative value of two components which are responsive to the same quantity.

2. A watt-responsive device for constant voltage alternating-current circuits comprising, in combination, means for producing a pair of in-phase voltages which vary in magnitude and phase with the voltage of said circuit, means for producing a single voltage which varies in magnitude and phase with the current in said circuit, and electro-responsive means energized by the arithmetical difference between two resultant voltages, one of said resultant voltages being equal to the vector sum of the circuit-current responsive voltage and one of the circuit-voltage responsive voltages, the other resultant voltage being equal to the vector difference between the circuit-current responsive voltage and the other circuit-voltage responsive voltage.

3. A watt-responsive device for a substantially constant voltage alternating-current power circuit comprising, in combination, means for deriving from said circuit a current-responsive voltage which varies in magnitude and phase with the current in said circuit and which is in phase with the voltage of said circuit at unity power factor, means for producing a control voltage equal to the vector resultant of said current responsive voltage and a fraction of said circuit voltage, means for producing a second control voltage equal to the vector resultant of said current responsive voltage and a different fraction of said circuit voltage, and electroresponsive means connected to be responsive to the arithmetical difference between said resultant voltages.

4. A watt-responsive device for a substantially constant voltage alternating-current power circuit comprising, in combination, means for deriving from said circuit a current-responsive voltage which varies in magnitude and phase with the current in said circuit and which is in phase with the voltage of said circuit at unity power factor, means for producing a control voltage equal to the vector resultant of said current-responsive voltage and a fraction of said circuit voltage, means for producing a second control voltage equal to the vector resultant of said current-responsive voltage and a different fraction of said circuit voltage, electroresponsive means connected to be responsive to the arithmetical difference between said resultant voltages, and means for varying the relative value of said fractional voltages.

5. Alternating-current watt-responsive apparatus comprising, in combination, an electroresponsive device, means for deriving from an alternating-current circuit whose power is to be responded to two resultant voltages, means for energizing said electroresponsive means in accordance with a differential effect of said two resultant voltages, means for providing each of said resultant voltages with a circuit-voltage responsive component and a circuit-current responsive component, the phase relation of said voltage and current responsive components being similar to the phase relation of the voltage and current of said circuit, and means for varying the relative magnitude of said voltage responsive components.

6. In a regulating system for an alternating-current power circuit, the combination of a potential transformer connected across said circuit, a pair of circuit elements serially connected across the secondary winding of said potential transformer, a current transformer connected in said circuit, an impedance connected across the secondary winding of said current transformer, the voltage drop across said impedance due to current flow in said current transformer being in phase with the voltage of the secondary winding of said potential transformer, means for effectively connecting said impedance between an intermediate point in the secondary winding of said potential transformer and the junction of said circuit elements, means for effectively shifting the position of said intermediate point, and power control means responsive to the difference between the voltages across said pair of circuit elements.

7. In a regulating system for an alternating-current power circuit, the combination of a potential transformer connected across said circuit, a pair of identical circuit elements serially connected directly across the secondary winding of said potential transformer, a current transformer connected in said circuit, an impedance connected across the secondary winding of said current transformer, the voltage drop across said impedance due to current flow in said current transformer being in phase with the voltage of the secondary winding of said potential transformer, means for effectively connecting said impedance between an intermediate point in the secondary winding of said potential transformer and the junction of said circuit elements, means for effectively shifting the position of said intermediate point, and power control means responsive to the difference between the voltages across said pair of circuit elements.

8. In a regulating system for an alternating-current power circuit, the combination of a potential transformer connected across said circuit, a pair of circuit elements serially connected across the secondary winding of said potential transformer, a current transformer connected in said circuit, an impedance connected across the secondary winding of said current transformer, the voltage drop across said impedance due to current flow in said current transformer being in phase with the voltage of the secondary winding of said potential transformer, means for effectively connecting said impedance between an intermediate point in the secondary winding of said potential transformer and the junction of said circuit elements, said intermediate point being displaced from the mid-point of said secondary winding, means for varying the value of said voltage drop independently of the value of current in said circuit, and power control means responsive to the difference between the voltages across said pair of circuit elements.

9. In combination, a pair of load circuits, a common main supply circuit for both of said load circuits, said load circuits being connected in multiple to said supply circuit, an auxiliary power supply generator connected to one of said circuits, means responsive to the power output of said generator for regulating said generator so that it normally supplies a constant base value of power, and means responsive to the load on one of said load circuits for so modifying the action of the regulating means for said generator that said generator carries a predetermined percentage of said load.

10. In combination, a pair of load circuits, a common main supply circuit for both of said load circuits, said load circuits being connected in multiple to said supply circuit, an auxiliary power supply generator connected to one of said circuits, means responsive to the power output of said generator for regulating said generator so that it normally supplies a constant base value of power, means responsive to the load on one of said load circuits for so modifying the action of the regulating means for said generator that said generator carries a predetermined percentage of said load, and means for varying the value of said base power.

11. In combination, a pair of load circuits, a common main supply circuit for both of said load circuits, said load circuits being connected in multiple to said supply circuit, an auxiliary power supply generator connected to one of said circuits, means responsive to the power output of said generator for regulating said generator so that it normally supplies a constant base value of power, means responsive to the load on one of said load circuits for so modifying the action of the regulating means for said generator that said generator carries a predetermined percentage of said load, and means for varying said predetermined percentage.

12. In combination, a pair of load circuits, a common main supply circuit for both of said load circuits, said load circuits being connected in multiple to said supply circuit, an auxiliary power supply generator connected to one of said circuits, an elastic fluid turbine for driving said auxiliary generator, means responsive to the power output of said generator for regulating said turbine so that said generator normally supplies a constant base value of power, means responsive to the load on one of said load circuits for so modifying the action of the regulating means for said turbine that said generator carries a predetermined percentage of said load, and means for varying said base power and predetermined percentage in proportion to a characteristic of the elastic fluid supplied to said turbine.

13. An electric power system comprising, in combination, a main power supply circuit, a plurality of load circuits connected in multiple to said supply circuit, an auxiliary generator connected to one of said circuits, regulating means responsive to the power supplied by said auxiliary generator for causing said generator to supply a predetermined minimum base value of power to said system, and means responsive to the load on one of said load circuits for causing said auxiliary generator to carry a predetermined percentage of said load in addition to the predetermined base value of power it supplies to said system.

14. An electric power system comprising, in combination, a main power supply circuit, a plurality of load circuits connected in multiple to said supply circuit, an auxiliary generator connected to one of said circuits, regulating means responsive to the power supplied by said auxiliary generator for causing said generator to supply a predetermined minimum base value of power to said system, means responsive to the load on one of said load circuits for causing said auxiliary generator to carry a predetermined percentage of said load in addition to the predetermined base value of power it supplies to said system, and means for adjusting the value of said base power.

15. An electric power system comprising, in combination, a main power supply circuit, a plurality of load circuits connected in multiple to said supply circuit, an auxiliary generator connected to one of said circuits, regulating means responsive to the power supplied by said auxiliary generator for causing said generator to supply a predetermined minimum base value of power to said system, means responsive to the load on one of said load circuits for causing said auxiliary generator to carry a predetermined percentage of said load in addition to the predetermined base value of power it supplies to said system, and means for adjusting said predetermined percentage.

16. An electric power system comprising, in combination, a main power supply circuit, a plurality of load circuits connected in multiple to said supply circuit, an auxiliary generator connected to one of said circuits, a steam turbine for driving said auxiliary generator, regulating means responsive to the power supplied by said auxiliary generator for causing said generator to supply a predetermined minimum base value of power to said system, means responsive to the load on one of said load circuits for causing said auxiliary generator to carry a predetermined percentage of said load in addition to the predetermined base value of power it supplies to said system, and means for varying said base power and predetermined percentage in proportion to the steam pressure supplied to said turbine.

17. An alternating-current power system comprising, in combination, a main alternating-current power supply circuit, a relatively constant load circuit connected to said supply circuit, a relatively widely variable load circuit connected to said supply circuit, an auxiliary turbo-generator connected to one of said circuits, and means responsive to the voltage of said system and to the in-phase component of the current of said auxiliary turbo-generator independently of the quadrature component of the current of said auxiliary turbo-generator for regulating said turbo-generator so that it supplies a predetermined minimum base value of power to said system, said current response being produced by the voltage drop in a rheostat which carries a current proportional to the current of said auxiliary turbo-generator.

18. An alternating-current power system comprising, in combination, a main alternating-current power supply circuit, a relatively constant load circuit connected to said supply circuit, a relatively widely variable load circuit connected to said supply circuit, an auxiliary turbo-generator connected to one of said circuits, means responsive to the voltage of said system and to the in-phase component of the current of said auxiliary turbo-generator independently of the quadrature component of the current of said auxiliary turbo-generator for regulating said turbo-generator so that it supplies a predetermined minimum base value of power to said system, said current response being produced by the voltage drop in a rheostat which carries a current proportional to the current of said auxiliary turbo-generator, and means for varying the resistance value of said rheostat inversely with the fluid pressure supplied to said turbine.

19. An alternating-current power system comprising, in combination, a main alternating-current power supply circuit, a relatively constant load circuit connected to said supply circuit, a relatively widely variable load circuit connected to said supply circuit, an auxiliary turbo-generator connected to one of said circuits, means responsive to the voltage of said system and to the in-phase component of the current of said auxiliary turbo-generator independently of the quadrature component of the current of said auxiliary turbo-generator for regulating said turbo-generator so that it supplies a predetermined minimum base value of power to said system, said current response being produced by the voltage drop in a rheostat which carries a current proportional to the current of said auxiliary turbo-generator, a second rheostat connected in series with the first one, and means for passing a current through said second rheostat which is proportional to the current in said widely variable load circuit.

FREDERICK E. CREVER.